Figure 1:
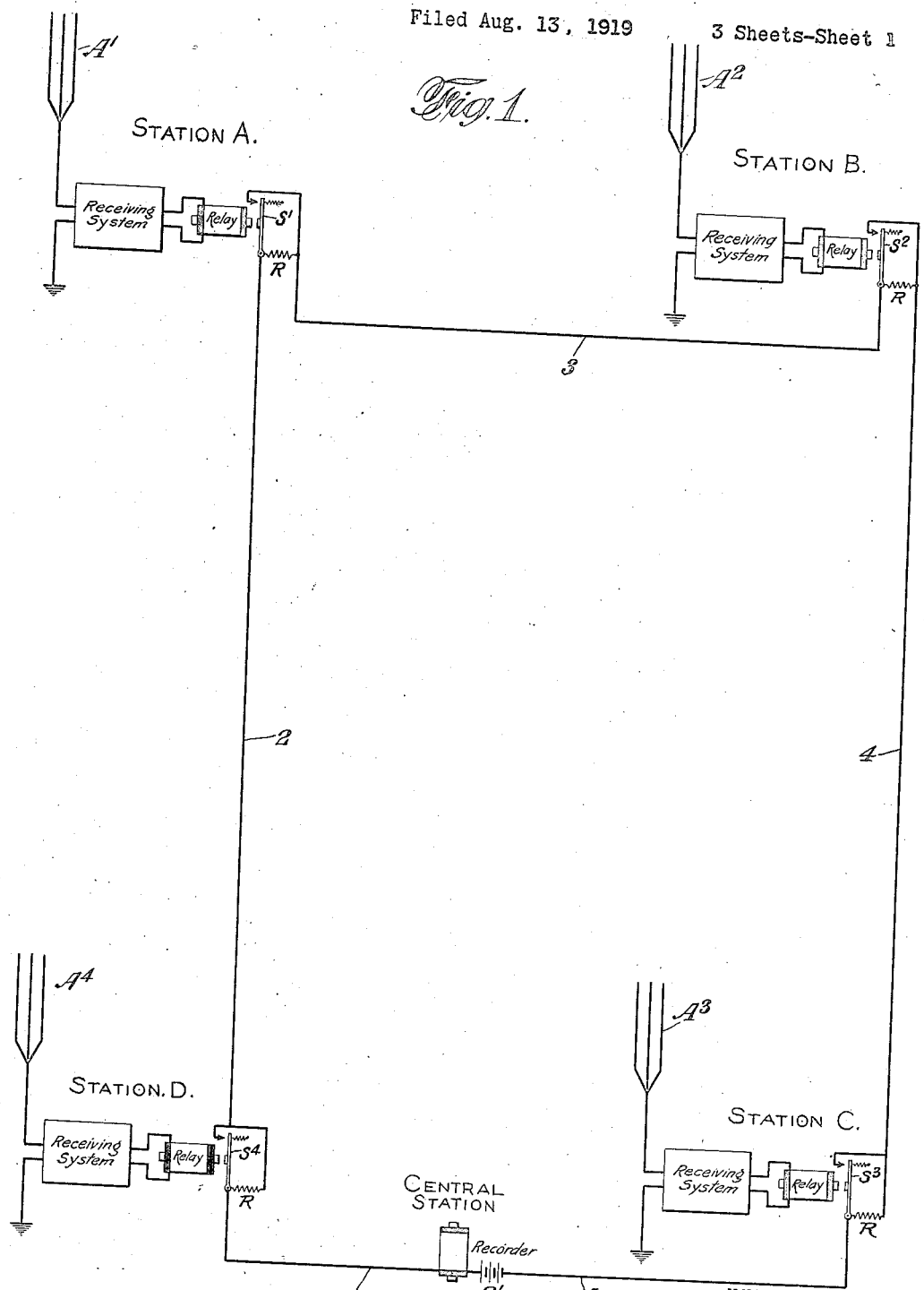

Dec. 18, 1923.
R. E. HALL
SIGNAL RECEIVING SYSTEM AND METHOD
Filed Aug. 13, 1919    3 Sheets-Sheet 2
1,477,645
Fig. 2.
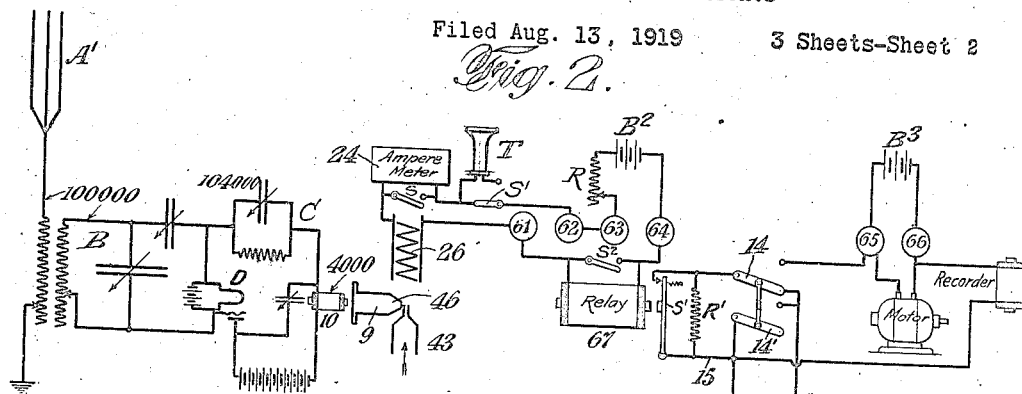
STATION A.
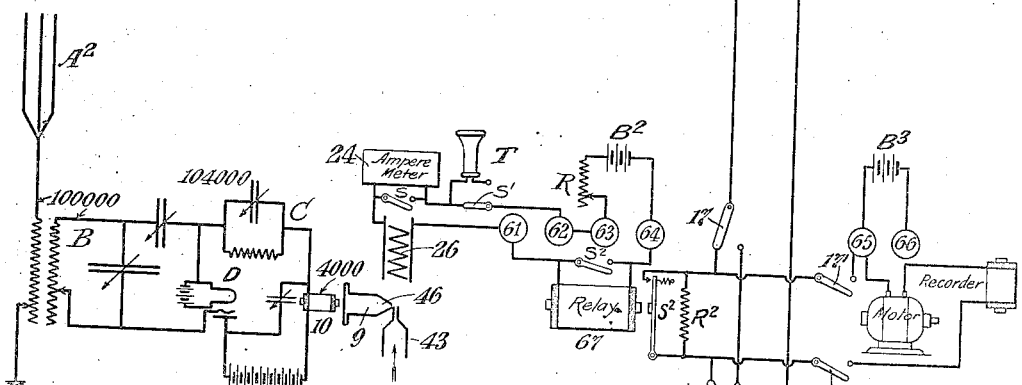
STATION B.
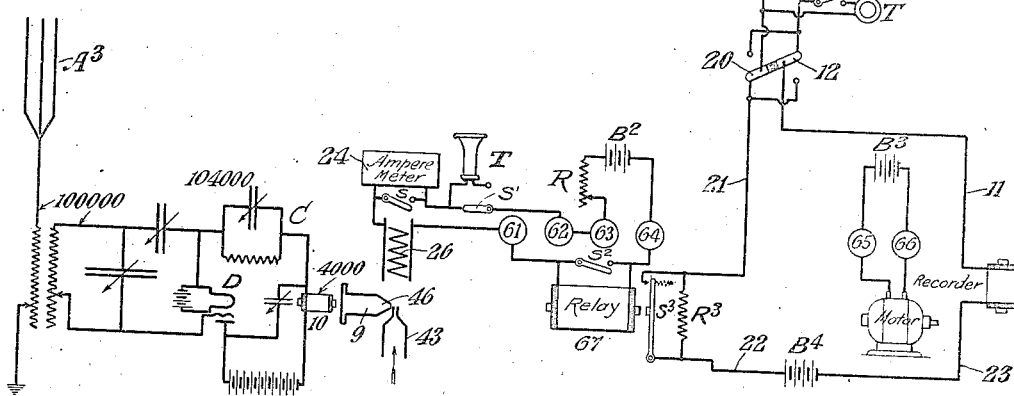
STATION C.
INVENTOR
Ray E. Hall
BY
ATTORNEY Dec. 18, 1923.

R. E. HALL 1,477,645

SIGNAL RECEIVING SYSTEM AND METHOD

Filed Aug. 13, 1919   3 Sheets-Sheet 3

INVENTOR
Ray E. Hall
BY
G. C. Dean ATTORNEY

Patented Dec. 18, 1923.

1,477,645

UNITED STATES PATENT OFFICE.

RAY EDWIN HALL, OF CHICAGO, ILLINOIS, ASSIGNOR TO HALL RESEARCH CORPORATION, A CORPORATION OF DELAWARE.

SIGNAL-RECEIVING SYSTEM AND METHOD.

Application filed August 13, 1919. Serial No. 317,119.

*To all whom it may concern:*

Be it known that I, RAY E. HALL, a citizen of the United States, and resident of Chicago, in the county of Cook and State of Illinois, have invented certain new and useful Improvements in Signal-Receiving Systems and Methods, of which the following is a specification.

My present invention relates more particularly to the receiving of signals transmitted by electro-magnetic waves propagated through natural media, and as disclosed herein, it comprises a so-called "wireless" telegraph receiving system.

The purpose of the invention is to decrease the effects of so-called "static" and "stray" disturbances which so frequently interfere with wireless telegraph communication. The effects of such disturbances are very well known to all wireless operators, but many of the details with reference to their origin and functioning remain more or less obscure even to experts. It may be said, however, that they appear to result from atmospheric disturbances and electrical storms which may be local or may cover a wide area.

Undoubtedly the static charges generated by action of the elements and accumulated by induction, conduction or convection, are important factors. The functioning of such electrical energy in the wireless system has peculiarities which make it almost impossible to get rid of its effects. The disturbing impulses function intermittently and in a disorderly manner to produce in the receiving system effects similar to spark discharges of varying intensity and the more violent discharges may operate to set the tuned receiving system oscillating in its own natural electrical frequency somewhat as a blow rings a bell or tuning fork. In the latter case the locally originated oscillation of the tuned receiving system has the same frequency and produces the same effects as the electro-magnetic waves from the sending station. However functioning, the static shows up in the wireless telegraph detector or amplifier creating effects similar in kind to the received waves and any means effective for amplifying the received waves is equally effective for amplifying the disturbances. The locally originated static disturbances are frequently of much greater energy than the faint signal waves available in long distance wireless telegraphy and commercial operation over long distances is at the present time wholly dependent on the electrical conditions of the natural media through which the waves are propagated.

My method of eliminating the effects of such natural electrical disturbances from the receiving system depends upon the discovery that the electrical discharges constituting the disturbances are seldom synchronous in independent receiving systems even though the multiplicity and intensity of the discharge may be substantially the same. My invention therefore consists in employing a plurality of independent receiving systems, all tuned to the same sending station, each provided with its own selective and amplifying appliances and then instead of utilizing the amplified variations separately, to produce separate signals in a telephone relay recorder or other indicating device, I connect the translating device, preferably a relay, at each station with those of the other stations and with a single recorder or other indicator which will operate in response to energy received at and simultaneously actuating all the stations but will not operate in response to energy received at any one of the stations. Consequently, the central station indicator will not respond at all to the unsynchronized static disturbances occurring at the several stations but will operate in response to the signal waves from the sending station which energize all the receiving systems synchronously. The synchronism required is only such synchronism as is necessary for the purpose. The difference in time of receipt of given waves at two distant stations may be totally disregarded since in no case can this difference in time amount to more than a very small fraction of a thousandth of a second. Obviously, care must be taken to make the time constants of the relay circuits as nearly equal as possible, and in all other respects to organize the system so that the substantial perfect synchronism of the received energy may be sufficiently preserved for the purpose in view. That is to say, any difference between the time periods of response of the various parts of the apparatus should be small as compared with the duration of a single element.

This principle of operation requires only that the stations be sufficiently independent to keep the static discharges of the several stations unsynchronized even though the amount and violence of the disturbance may be substantially the same from moment to moment. In most cases, I prefer, however, that the several receiving stations be spaced apart, preferably to a distance of several miles. Where the expense is not an important factor, they may be located many miles apart so that they will be in regions where the electrical conditions are different for the different stations, as for instance, there might be a local thunder storm at one station and fair weather at one or more of the other stations.

Obviously, the above method may be practiced by utilizing the elements of any known or desired wireless receiving system. Any of the known expedients for tuning out or otherwise preventing interference from adjacent stations and insuring operation only by a desired sending station may be employed.

In the preferred embodiment of my invention, the receiving system and the translating devices employed in connection therewith will be of such a nature as to permit the received signals to open and close a relay circuit at intervals corresponding to the dots and dashes of the Morse code, as for instance, the sensitive jet and interpreting relay system disclosed in my Patent No. 1,378,345. Obviously, however, any other system giving a clean make and break or even a wide variation of current flow will be equally adapted for interdependent operation by merely connecting the relay circuit of all stations in series with the indicator circuit of the central station. Obviously, each station may be a complete station capable of independently receiving or recording and adapted to have their relays coupled up to operate interdependently when desired. On the other hand, it will be recognized that the essential is merely that the antennæ or aerial receiving wires be independent, it being immaterial what method is employed for conveying to the central station, the energy impulses collected by the antennæ.

Figure 3:
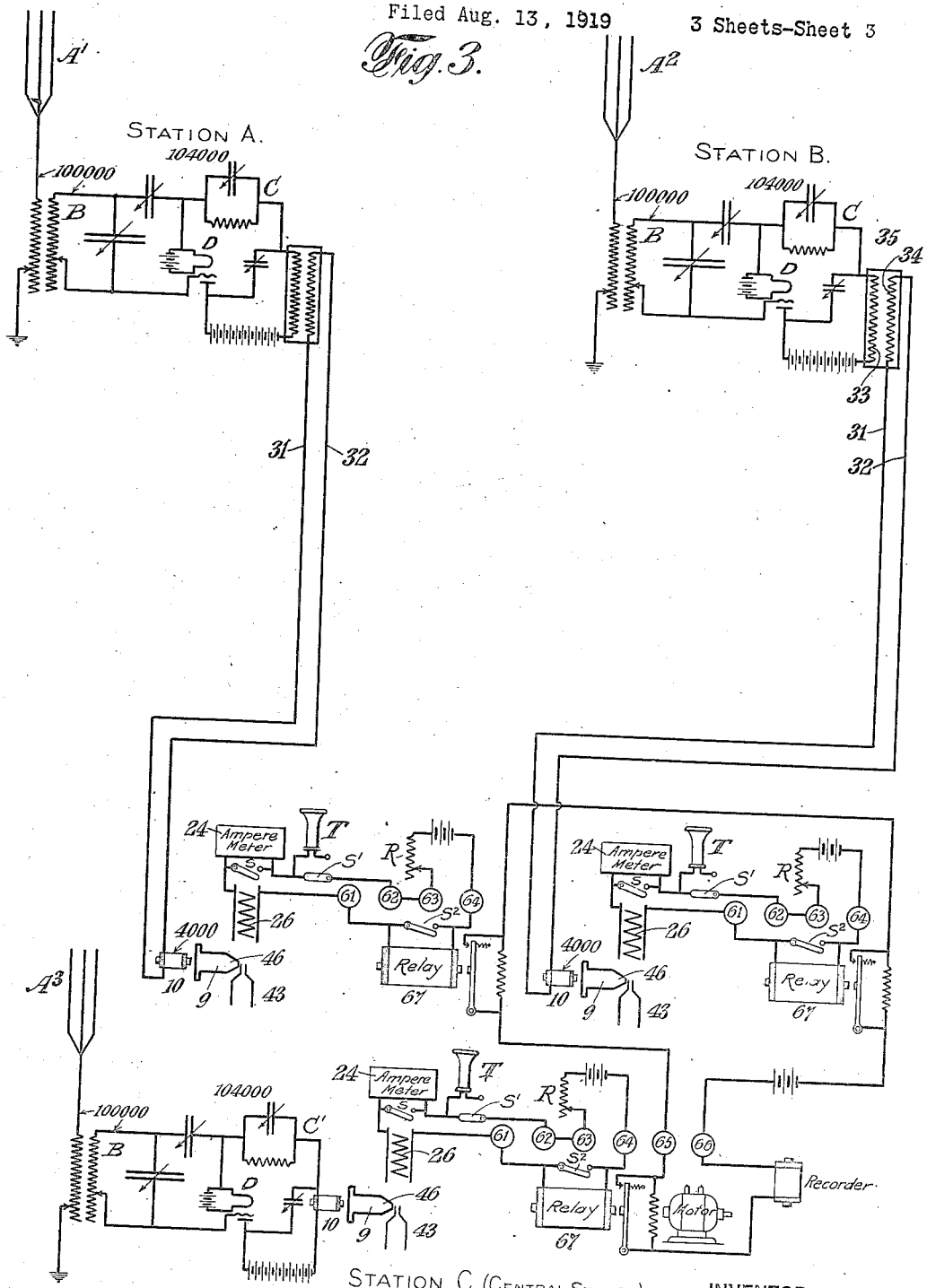

The above and other features and details of my invention may be more fully understood from the following description in connection with the accompanying drawings, in which Figure 1 is a diagrammatic view illustrating how my invention may be practiced in connection with any known or desired receiving systems;

Figure 2 is a diagram indicating a desirable type of receiving system and a desired method of connecting up the same for practice of my invention; and Figure 3 is a diagram showing a modified arrangement of the receiving system shown in Figure 2.

In Figure 1 the essentials of my invention are indicated by the legends on the diagram. There are four separate sets of aerial receiving wires, receiving systems and relays, indicated as stations A, B, C and D and the make and break switches $S^1$, $S^2$, of the relays at the several stations are connected in series with each other, through a battery and recorder or other receiving instrument located at a central station, by wire circuit 1, 2, 3, 4, 5. As this circuit is like any ordinary telegraph circuit carrying ordinary dot and dash signals, there is no difficulty in making it as long or as short as desired. Hence, stations A, B, C and D may be close together or many miles apart, and the central station may be located at or near one of them, or at a central point, or at a remote point, as may be necessary or desirable. The break at switches $S^1$, $S^2$, etc. may be shunted by resistances $R^1$, $R^2$, etc. respectively.

The operation of the system is as follows:

With the relay switches open as shown, no current can flow through circuit 1, 2, 3, 4, 5 except through the shunt resistance and as these are usually of high resistance, the amount flowing will be very small. In any event, the recorder at the central station will be arranged and adjusted so that it will not operate in response to any normal current flowing through the circuit. If now a wireless signal is sent from a distant station, it will energize the independent aerial collecting wires $A^1$, $A^2$, $A^3$, $A^4$ separately and independently but at precisely the same instant. Therefore, all relay switches $S^1$, $S^2$, $S^3$, $S^4$, will be attracted by the relay magnets and will close the circuit, thereby allowing full battery current to flow through the recorder or other receiving instrument at the central station.

Obviously this operation requires closing of all four relays and if any one, two or three of the four are closed by static or other disturbances, there will be no indication of it at the central station and no false record can be made. Hence, perfect wireless telegraph communication may be had at the central station provided even one of the stations is not troubled by static to an extent sufficient to close its relay circuit at times when signals are not being received.

Furthermore, suppose that all four stations happen to be in a region where they are all troubled at the same time by static discharges of approximately the same intensity and disturbing quality. At each one of the stations, the operation of the relay will be interfered with, the disturbance operating to close the relay switch intermittently and regardless of whether or not the wireless energy is or is not operating at that instant to cause a closure for a dot or for a dash.

Nevertheless, the static disturbances being non-synchronous at the several stations, do not occur at the same time except by chance and the chances that such stray disturbances can close all four switches at the same instant are remote. In fact, the number of stations may be reduced to three or even two and yet not have much static disturbance indicated at the central station, because the times when the static will close the relay switches simultaneously at two stations are infrequent, though, of course, not so infrequent as where three or four or more stations are employed.

The independent receiving systems may be separate operator's stations with complete receiving or recording outfits adapted to operate independently if desired, or to be coupled up for the above described interdependent operation according to my method. Suitable receiving and recording systems for this purpose are indicated in Figure 2. In this case, the elements employed are those shown in my above mentioned application and as all three of them are substantially the same except for the means for interdependently connecting them, a description of one will serve for all.

The aerial A' and the local oscillating circuit B are supposed to be tuned to and energized by received waves of 100,000 frequency. A local oscillatory circuit C is supposed to be operatively associated therewith and with the audion D so that a heterodyne frequency of 4000 will be impressed upon telephone 10 and the resonator 9 may be tuned to the same frequency. The jet outlet 43 discharges in proximity to the contracted orifice 46 of resonator 9. The jet is directed along the axis of the fine wire coil 26 which is connected in series with the battery B² through adjustable resistance R. There is an ampere meter 24 which may be thrown in series or shunted by means of switch $s$, a telephone receiver T which may be shunted by switch $s^1$ and the relay 67 which may be shunted by switch $s^2$. With this arrangement the ampere meter may be put in series to measure the flow of normal heating current through the coil 26 and the variations of such flow may be utilized as the visual indicator of the received message. The telephone T may be thrown in or out to serve as an audible indicator and the relay 67 in or out to operate the recorder. The connections of the relay and recorder are through 61, 62, 63, 64, 65 and 66 which represent binding posts.

The recorder circuit controlled by the relay includes the battery B³ connected to binding posts 65 and 66 which in turn are wired to serially connect the armature operated switch of the relay and the operating magnet of the recorder. The same battery energizies the motor for unreeling the tape, through a parallel circuit across said binding posts 65, 66.

The jet when properly adjusted will be broken down by the air pulses in resonator 9 which take effect through orifice 46 on the sensitive base of the jet at nozzle 43. The breaking or "bushing" of the jet spreads the air blast so that it impinges on the fine wire 26. This may be Wollaston wire, say .0002 to .0004 inches in diameter. Each break of the jet and resulting impingement of the air on the wire cools it, and successive breaks corresponding to the frequency of the impulses in the magnet 10, operate cumulatively to cool the wire faster than it can be heated by the battery current flowing in the fine wire. This cooling lowers the resistance of the wire thereby increasing the battery current flow until it is sufficient to close the switch of relay 67. This condition continues so long as the pulses continue in magnet 10, that is, a short time for a dot and a longer time for a dash. This, of course, gives ordinary telegraph "dot-and-dash" flow of battery current in the circuit of the relay switch and may be utilized to operate any desired form of indicator or recorder.

This type of receiving system, which is more fully described and claimed by my said prior application, is shown in Figure 2 (and also in Figure 3) as being a receiving system which is peculiarly adapted for practice of my present invention, but other receiving apparatus adapted for the same purpose may be used, as for instance, the jet operated relay of my prior Patents Nos. 1,160,072 and 1,205,530 and the recorder of my Patent No. 1,213,356 may be utilized.

The above described heterodyne method of producing a lower frequency, in this case 4000 per second, is only one way of causing the dots and dashes to be indicated by an audible note, prolonged for a dash, and short for a dot, and, so far as concerns my present invention, any other known or desired means for the purpose may be employed. For instance, the circuit C of 104,000 frequency may be omitted and an interrupter of desired frequency inserted in the circuit of the audion battery and telephone magnet 10. Moreover, where the sending station operates by the ordinary spark method, no such means is necessary at the sending station since the signals as received will be a note of the same frequency as the spark of the sending station.

In Figure 2, the three stations have their relays connected in series with each other and with a recorder at one of the stations by an ordinary wire circuit. Suitable switches are provided whereby any one station may be cut out of such circuit and its relay connected directly with its recorder circuit. In Figure 2, station C is shown as being the one connected up to serve as a central station. At this station, the recorder, or other receiver, is connected through conductor 11, switch arm 12, line wire 13, and switch 14 in series with the relay switch S' at station A.

From switch S' the circuit is through conductor 15, line wire 16 to switch 17 at station B, thence through relay switch S², line wire 19, switch arm 20, and wire 21 to relay switch S³ at station C; thence through wire 22, battery B⁴ and wire 23 back to the recorder of station C. Station A may be cut out and its recorder cut in by throwing switch 14, 14'. Station B may be cut out by throwing switches 17, 18 and the recorder cut in by closing switches 17', 18'. Station C may be cut out and the recorder connected by throwing the double arm switch 12, 20 thereby connecting wire 13 with 19 and wire 11 with wire 21.

More or less of the elements of the separate receiving systems may be located at the central station. For instance, lengthening the wire connections between the jet controlled hot wire 26 and the relay 67, is all that is required to bring the relay to the central station. Similarly, it requires only lengthening of the wire connections to bring to the central station the telephone magnet 10, sensitive jet 43, hot wire 26, and ampere meter, as well as the relay. The latter arrangement with a desirable modification is shown in Figure 3.

In Figure 3 the connection of the telephone magnet 10 to the audion-controlled battery circuit at the receiving station, is through line wires 31, 32 but these wires, instead of being conductively connected in series with the audion and battery circuit, are inductively associated therewith by means of a transformer having its primary 33 in the audion-controlled battery circuit, and its secondary 34 in the line wire circuit. This transformer is preferably of the telephonic type having an iron core diagrammatically indicated at 35. With this arrangement, the 4000 frequency note, (short for a dot and prolonged for a dash) will be inductively transmitted through the transformer and line to telephone magnet 10. At the same time any electromagnetic signal waves that may be collected by the line wire acting as an aerial or antenna, will be kept out of the audion circuit, being choked out by the high inductance of the transformer due to its iron core.

While I have described various arrangements of apparatus suitable for utilizing electro-magnetic signal waves in accordance with my invention, it will be evident that broadly considered, the underlying method consists in employing a plurality of receiving systems for electro-magnetic waves, said systems having their wave-receiving elements in operative receiving relation to the same signal sending apparatus but in different receiving relations with respect to electrical disturbances of different origin; and then, selectively and successively, from instant to instant, utilizing the signal impulses of the receiving system least disturbed at that instant to determine the production of a complete signal indication or record comprising the least erroneous portions of all the signal impulses received in all of the systems during a given time. Specifically considered, this is accomplished by utilizing in the indicator or recorder, only those indications or parts of indications which are simultaneous in all the receiving systems, preferably by having each receiving system operate its own separate switch in the indicator circuit so that all said switches must be operated in order to operate the indicator or recorder.

While I have described my method with particular mention of "static" and "stray" disturbances, the same principles apply with respect to other electrical disturbances including those due to industrial and commercial uses of electricity, particularly high potential generating, transmitting and translating apparatus, and including other wireless transmitting stations operating over the territory. As before mentioned, the invention may be employed in connection with any desired appliances or expedients for selectively excluding the disturbing station and for receiving from one desired sending station to the exclusion of others. This is particularly true with respect to directionally selective receiving systems, it being very desirable in some cases to have the several receiving stations all arranged to receive from the direction of the one desired sending station but differing in direction location with respect to the interfering sending station. In such case, the indicator controlled by all the receiving stations will be operated by waves from the direction of the desired station but not by waves from the disturbing station.

I claim:

1. The method of obviating effects of electrical disturbances when signalling by electro-magnetic waves, which method consists in employing a plurality of receiving systems for the electro-magnetic waves, said systems having their wave-intercepting elements in operative relation to the same signal sending apparatus but in differing receiving relations with respect to electrical disturbances of different origin; and then selectively and successively, from instant to instant, utilizing the signal impulses of that one of the receiving systems which is then least disturbed, to determine the production of a complete signal indication or record comprising the least erroneous portions of all of the signal impulses received in all of the systems during a given time.

2. The method of obviating effects of electrical disturbances when signaling by electro-magnetic waves, which method consists in employing a plurality of receiving systems for the electro-magnetic waves, said systems having their wave-intercepting elements in operative relation to the same signal sending apparatus but in differing receiving relations with respect to electrical disturbances of different origin; and then selectively and successively, from instant to instant, utilizing the signal impulses of that one of the receiving systems which is then least disturbed, to determine the production of a complete signal indication or record comprising the least erroneous portions of all of the signal impulses received in all of the systems during a given time, by utilizing in the indicator or recorder only those indications or parts of indications which are simultaneous in all the receiving systems.

3. The method of eliminating effects of electrical disturbances when signalling by electro-magnetic waves, which method consists in employing a plurality of receiving systems for the electro-magnetic waves, said systems having their wave-intercepting elements in operative relation to the same signal sending apparatus but in differing receiving relations with respect to electrical disturbances of different origin; and then selectively and successively, from instant to instant, utilizing the signal impulses of that one of the receiving systems which is being least disturbed, to determine the production of a complete signal indication or record comprising the least erroneous portions of all of the signal impulses received in all of the systems during a given time by having each receiving system throw its own separate switch in an indicator circuit so that said indicator or recorder will be operated only when all said switches are thrown.

4. The method of eliminating effects of electrical disturbances when signalling by electro-magnetic waves, which method consists in employing a plurality of receiving systems for the electro-magnetic waves, said systems having their wave-intercepting elements in operative relation to the same signal sending apparatus but in differing receiving relations with respect to electrical disturbances of different origin; and then selectively and successively, from instant to instant, utilizing the signal impulses of that one of the receiving systems which is least disturbed at that instant, to determine the production of a complete signal indication or record comprising the least erroneous portions of all of the signal impulses received in all of the systems during a given time by having each receiving system operate its own separate circuit closer in an indicator circuit so that said indicator or recorder will be operated only when all said switches are closed.

5. The method of obviating effects of natural electrical disturbance when signaling by electro-magnetic waves, which method consists in intercepting the radiant energy representing the signal by a plurality of independent, widely separated receiving elements arranged so that all are synchronously and operatively affected by said signal energy but differently related to the electrical disturbance and differently affected thereby, and separately utilizing the energies so received by each of said receiving elements to control separately but interdependently the actuation of the indicating instrument.

6. The method of obviating effects of natural electrical disturbance when signalling by electro-magnetic waves, which method consists in intercepting the radiant energy representing the signal by a plurality of independent, widely separated receiving systems, and separately utilizing energies received by the respective receiving systems to produce amplified flow of current corresponding to the signals in the local circuit of each of said receiving systems, and separately applying said amplified currents to close separate, normally open switches in a circuit including said switches, a source of electrical energy and an indicator adapted to be operated thereby.

7. The method of obviating effects of electrical disturbances upon the indicating instrument of a receiving system, which method consists in receiving the energy representing the signal by a plurality of receiving elements which are separated so that, while responding synchronously to the received signals, the effects of an electrical disturbance will be different in the different receiving elements; and utilizing the energies so received, separately but interdependently, to control the actuation of the indicating instrument.

8. In a signalling apparatus of the class described, a plurality of separate receiving systems for electro-magnetic waves, said systems having their wave receiving elements in operative receiving relation to the same signal sending apparatus but located at points sufficiently remote from each other so as to be differently affected by electrical disturbances of different origin, in combination with an indicator, an indicator circuit, and means controlled by each of the receiving systems operating to control said indicator circuit to actuate said indicator only at times when all of said wave receiving elements are energized.

9. In the combination defined by claim 8, the further feature of controlling said indicator circuit by circuit closing means adapted to close said circuit only by energy simultaneously applied from all of said receiving systems.

10. In the combination specified by claim 9, the further feature of having each of the receiving systems comprise a wave responsive device, a battery circuit controlled thereby, a sensitive jet, means for breaking down said jet during times of increased flow of current in said battery circuit and means including a circuit closer responsive to changes in said jet, all of said circuit closers being serially arranged in the indicator circuit.

11. In a system for signalling by electromagnetic waves, a plurality of receiving stations adapted to receive from the same sending systems but located in different places so as to be differently affected by local electrical disturbances, each receiving system comprising, a wave-receiving element, a relay switch and translating devices for controlling said switch by the received energy, and in combination with the several receiving stations, a source of electrical energy and a single circuit therefor serially connecting the terminals of all said relay switches, so that the flow of current in said circuit is dependent upon actuation of all said switches; and a translating device controlled by said circuit.

Signed at Montreal, in the Province of Quebec and Dominion of Canada, this 8th day of August A. D. 1919.

RAY EDWIN HALL.